US009894522B2

(12) United States Patent
Chen

(10) Patent No.: US 9,894,522 B2
(45) Date of Patent: Feb. 13, 2018

(54) METHODS OF AUTOMATICALLY ANSWERING A PHONE CALL WITH A MOBILE TERMINAL AND ASSOCIATED MOBILE TERMINALS

(71) Applicant: Huizhou TCL Mobile Communication Co., Ltd., Huizhou, Guangdong (CN)

(72) Inventor: Qiong Chen, Huizhou (CN)

(73) Assignee: HUIZHOU TCL MOBILE COMMUNICATION CO., LTD., Huizhou, Guangdong Province (CN)

( * ) Notice: Subject to any disclaimer, the term of this patent is extended or adjusted under 35 U.S.C. 154(b) by 0 days.

(21) Appl. No.: 15/322,378

(22) PCT Filed: Mar. 16, 2016

(86) PCT No.: PCT/CN2016/076483
§ 371 (c)(1),
(2) Date: Dec. 27, 2016

(87) PCT Pub. No.: WO2017/028526
PCT Pub. Date: Feb. 23, 2017

(65) Prior Publication Data
US 2017/0245144 A1 Aug. 24, 2017

(30) Foreign Application Priority Data

Aug. 17, 2015 (CN) .......................... 2015 1 0505800

(51) Int. Cl.
*H04W 12/06* (2009.01)
*H04M 1/725* (2006.01)
(Continued)

(52) U.S. Cl.
CPC .......... *H04W 12/06* (2013.01); *G06F 3/0414* (2013.01); *G06K 9/00255* (2013.01);
(Continued)

(58) Field of Classification Search
CPC .................. H04W 12/06; G06F 3/0414; G06F 2203/04104; G06K 9/00255;
(Continued)

(56) References Cited

U.S. PATENT DOCUMENTS

| 2008/0013794 A1* | 1/2008 | Kalker ............... G06K 9/00362 382/115 |
| 2008/0158146 A1* | 7/2008 | Westerman ........ G06K 9/00375 345/156 |

(Continued)

FOREIGN PATENT DOCUMENTS

| CN | 103257873 A | 8/2013 |
| CN | 103825998 A | 5/2014 |

(Continued)

OTHER PUBLICATIONS

International Search Report on corresponding PCT application (PCT/CN2016/076483) from International Searching Authority (CN) dated May 4, 2016.

*Primary Examiner* — Mehmood B Khan
(74) *Attorney, Agent, or Firm* — Cheng-ju Chiang

(57) ABSTRACT

Methods of automatically answering a phone call with a mobile terminal and associated mobile terminals are disclosed. A method includes: if there is an incoming phone call, obtaining every predetermined period of time a pressure value and coordinates of each contact point between an ear of a current user and a touch screen; obtaining an outer contour of the ear based on the pressure values and coordinates; selecting among the outer contour three parts of the ear to establish reference coordinate axes; obtaining relative coordinates of each contact point corresponding to each part in the outer contour with respect to the reference coordinate axes; comparing the relative coordinates with pre-stored sample coordinates that comprise coordinates of each part of an ear of an authorized user relative to reference coordinate (Continued)

axes; and if the relative coordinates match with the pre-stored sample coordinates, unlocking the mobile terminal and answering the phone call.

20 Claims, 2 Drawing Sheets

(51) Int. Cl.
*G06F 3/041* (2006.01)
*G06K 9/00* (2006.01)

(52) U.S. Cl.
CPC ..... *G06K 9/00281* (2013.01); *G06K 9/00288* (2013.01); *H04M 1/72519* (2013.01); *G06F 2203/04104* (2013.01); *H04M 2250/22* (2013.01)

(58) Field of Classification Search
CPC .......... G06K 9/00281; G06K 9/00288; H04M 1/72519; H04M 2250/22
See application file for complete search history.

(56) References Cited

U.S. PATENT DOCUMENTS

| | | | |
|---|---|---|---|
| 2008/0158185 A1* | 7/2008 | Westerman | G06F 3/0488 345/173 |
| 2013/0259221 A1* | 10/2013 | Shusaku | H04M 1/02 379/390.01 |
| 2014/0099992 A1* | 4/2014 | Burns | G06F 3/044 455/550.1 |
| 2014/0314247 A1 | 10/2014 | Zhang | |
| 2015/0148010 A1* | 5/2015 | Nakazato | G06F 3/0412 455/411 |
| 2015/0161459 A1* | 6/2015 | Boczek | G06K 9/00885 382/115 |

FOREIGN PATENT DOCUMENTS

| | | |
|---|---|---|
| CN | 103856613 A | 6/2014 |
| CN | 104704801 A | 6/2015 |
| CN | 105120089 A | 12/2015 |
| JP | 2009239409 A | 10/2009 |

* cited by examiner

METHODS OF AUTOMATICALLY ANSWERING A PHONE CALL WITH A MOBILE TERMINAL AND ASSOCIATED MOBILE TERMINALS

CROSS-REFERENCE TO RELATED APPLICATIONS

The present application is a 35 U.S.C. § 371 National Phase conversion of International (PCT) Patent Application No. PCT/CN2016/076483 filed Mar. 16, 2016, which claims foreign priority of Chinese Patent Application No. 201510505800.3, filed on Aug. 17, 2015 in the State Intellectual Property Office of China, the contents of all of which are hereby incorporated by reference.

TECHNICAL FIELD

The present disclosure generally relates to the field of mobile terminals, and in particular relates to methods of automatically answering a phone call with a mobile terminal, and associated mobile terminals.

BACKGROUND

As mobile terminals continue to evolve, users are having increasingly higher requirements for the intelligence level of mobile terminals. Currently, to answer a phone call on a mobile terminal, the user may need to first unlock the phone and then tap on an answer key, which is inconvenient and cannot meet the user's requirements for the intelligence level of mobile terminals.

SUMMARY

Embodiments of the present disclosure provide methods of automatically answering a phone call with a mobile terminal and associated mobile terminals, whereby the user can automatically answer a phone call by simply touching his ear to a touch screen of the mobile terminal, providing ease of use with mobile terminals.

There is provided a method of automatically answering a phone call with a mobile terminal, the method comprising: obtaining coordinates (e.g., a pair of coordinates or coordinate pair) of each part of an ear of an authorized user with respect to reference coordinate axes and storing the coordinates as sample coordinates (e.g., a plurality of sample coordinate pairs); if there is an incoming phone call on the mobile terminal, obtaining every predetermined period of time a pressure value and coordinates of each contact point between an ear of a current user and a touch screen of the mobile terminal, each pressure value comprising a pressure magnitude and pressure area; determining whether a number of the contact points as detected is smaller than a first predetermined value; if so determined, then prompting the current user to re-contact the ear with the touch screen, otherwise if the number of the contact points is greater than or equal to the first predetermined value, obtaining an outer contour of the ear of current user based on the pressure values and the coordinates; selecting among the outer contour three parts of the ear to establish reference coordinate axes; obtaining relative coordinates (e.g., a pair of relative coordinates or relative coordinate pair) of each contact point corresponding to each part in the outer contour with respect to the reference coordinate axes; comparing the relative coordinates (e.g., a plurality of relative coordinate pairs) with the pre-stored sample coordinates (e.g., the plurality of sample coordinate pairs), the sample coordinates comprising the coordinates of each part of the ear of the authorized user relative to the reference coordinate axes; and if the relative coordinates match with the pre-stored sample coordinates, unlocking the mobile terminal and answering the phone call. Comparing the relative coordinates with the pre-stored sample coordinates may comprise: computing an absolute difference between each abscissa in each relative coordinate pair and an abscissa in a sample coordinate pair, and an absolute difference between an ordinate in the relative coordinate pair and an ordinate in the sample coordinate pair, the relative coordinate pair and the sample coordinate pair corresponding to a same part of the ear, the absolute difference between the abscissas being recorded as a first absolute value, and the absolute difference between the ordinates as a second absolute value; obtaining a number of the relative coordinate pairs each of which the first absolute value lies within a first predetermined range and the second absolute value lies within a second predetermined range; and if the number is not smaller than a second predetermined value, determining that the relative coordinates match with the pre-stored sample coordinates.

Selecting among the outer contour the three parts of the ear to establish the reference coordinate axes may comprise: selecting from the outer contour a crus of helix, tragus, and antitragus of the ear to establish the reference coordinate axes.

There is also provided a method of automatically answering a phone call with a mobile terminal, the method comprising: if there is an incoming phone call on the mobile terminal, obtaining every predetermined period of time a pressure value and coordinates of each contact point between an ear of a current user and a touch screen of the mobile terminal, each pressure value comprising a pressure magnitude and pressure area; obtaining an outer contour of the ear of current user based on the pressure values and the coordinates; selecting among the outer contour three parts of the ear to establish reference coordinate axes; obtaining relative coordinates (e.g., a pair of relative coordinates or relative coordinate pair) of each contact point corresponding to each part in the outer contour with respect to the reference coordinate axes; comparing the relative coordinates with pre-stored sample coordinates, the sample coordinates comprising the coordinates (e.g., a pair of coordinates or coordinate pair) of each part of an ear of an authorized user relative to reference coordinate axes; and if the relative coordinates (e.g., a plurality of relative coordinate pairs) match with the pre-stored sample coordinates (e.g., the plurality of sample coordinate pairs), unlocking the mobile terminal and answering the phone call.

The method may further comprise, after obtaining every predetermined period of time the pressure value and coordinates of each contact point between the ear of the current user and the touch screen: determining whether a number of the contact points as detected is smaller than a first predetermined value; if so determined, then prompting the current user to re-contact the ear with the touch screen, otherwise if the number is greater than or equal to the first predetermined value, performing the block of obtaining the outer contour of the ear of the current user based on the pressure values and the coordinates.

Comparing the relative coordinates with the pre-stored sample coordinates may comprise: computing an absolute difference between each abscissa in each relative coordinate pair and an abscissa in a sample coordinate pair, and an absolute difference between an ordinate in the relative coordinate pair and an ordinate in the sample coordinate pair, the relative coordinate pair and the sample coordinate pair corresponding to a same part of the ear, the absolute difference between the abscissas being recorded as a first absolute value, and the absolute difference between the ordinates as a second absolute value; obtaining a number of the relative coordinate pairs each of which the first absolute value lies within a first predetermined range and the second absolute value lies within a second predetermined range; and if the number is not smaller than a second predetermined value, determining that the relative coordinates match with the pre-stored sample coordinates.

Selecting among the outer contour the three parts of the ear to establish the reference coordinate axes may comprise: selecting from the outer contour a crus of helix, tragus, and antitragus of the ear to establish the reference coordinate axes.

The method may further comprise, before obtaining every predetermined period of time the pressure value and coordinates of each contact point: obtaining coordinates (e.g., a pair of coordinates or coordinate pair) of each part of an ear of an authorized user with respect to reference coordinate axes and storing the coordinates as sample coordinates.

There is also provided a mobile terminal for automatically answering a phone call, the mobile terminal comprising a touch screen and a Digital Signal Processing (DSP) unit. The touch screen may be configured to, if there is an incoming phone call on the mobile terminal, obtain every predetermined period of time a pressure value and coordinates of each contact point between an ear of a current user and the touch screen, each pressure value comprising a pressure magnitude and pressure area. The DSP unit may be configured to: obtain an outer contour of the ear of the current user based on the pressure values and the coordinates; select among the outer contour three parts of the ear to establish reference coordinate axes; obtain relative coordinates (e.g., a pair of relative coordinates or relative coordinate pair) of each contact point corresponding to each part in the outer contour with respect to the reference coordinate axes; compare the relative coordinates (e.g., a plurality of relative coordinate pairs) with pre-stored sample coordinates (e.g., a plurality of sample coordinate pairs), the sample coordinates comprising the coordinates of each part of an ear of an authorized user relative to reference coordinate axes; and, if determining the relative coordinates match with the pre-stored sample coordinates, unlock the mobile terminal and automatically answer the phone call.

The DSP unit may be configured to: determine whether a number of the contact points as detected is smaller than a first predetermined value; and if so determined, then prompt the current user to re-contact the ear with the touch screen, otherwise if the number is equal to or greater than the first predetermined value, perform the operation of obtaining the outer contour of the ear of the current user based on the pressure values and the coordinates.

The DSP unit may be configured to: compute an absolute difference between an abscissa in each relative coordinate pair and an abscissa in a sample coordinate pair, and an absolute difference between an ordinate in the relative coordinate pair and an ordinate in the sample coordinate pair, the relative coordinate pair and the sample coordinate pair corresponding to a same part of the ear, the absolute difference between the abscissas being recorded as a first absolute value, and the absolute difference between the ordinates as a second absolute value; obtain a number of the relative coordinate pairs each of which the first absolute value lies within a first predetermined range and the second absolute value lies within a second predetermined range; and, if the number is not smaller than a second predetermined value, determine the relative coordinates match with the pre-stored sample coordinates.

The DSP unit may be configured to select from the outer contour a crus of helix, tragus, and antitragus of the ear to establish the reference coordinate axes.

The mobile terminal may further comprise an application processor configured to: package the sample coordinates into firmware that is recognizable by the DSP unit; control the DSP unit to switch from operating mode to download mode to download the firmware to the DSP unit; and continue to control the DSP unit to switch from the download mode back to the operating mode.

Advantages of the present disclosure may follow. According to the methods of automatically answering a phone call with a mobile terminal that is provided by the disclosure, if there is an incoming phone call on the mobile terminal, a pressure value and coordinates of each contact point between an ear of a current user and a touch screen of the mobile terminal would be obtained every predetermined period of time. Then an outer contour of the ear can be analyzed according to the pressure values and the coordinates. Among the outer contour three parts of the ear may then be selected to establish reference coordinate axes and relative coordinates (e.g., a pair of relative coordinates or relative coordinate pair) of each contact point corresponding to each part in the outer contour can thus be computed with respect to the reference coordinate axes. The relative coordinates (e.g., a plurality of relative coordinate pairs) will then be compared against pre-stored sample coordinate (e.g., a plurality of sample coordinate pairs), and, if they match with each other, the mobile terminal can be unlocked and can then automatically answer the phone call. Thus, with the present disclosure the user can automatically answer a phone call by simply touching this ear to the touch screen of the mobile terminal, thereby providing ease of use with mobile terminals.

DETAILED DESCRIPTION

Certain terms are used throughout the following description and claims, which refer to particular components. As those of skilled in the art will appreciate, manufacturers may refer to a component by different names. This document does not intend to distinguish between components that differ in name but not in function. Hereinafter the present disclosure will be described in greater detail with reference made to the following embodiments and the accompanying drawings.

Figure 1:
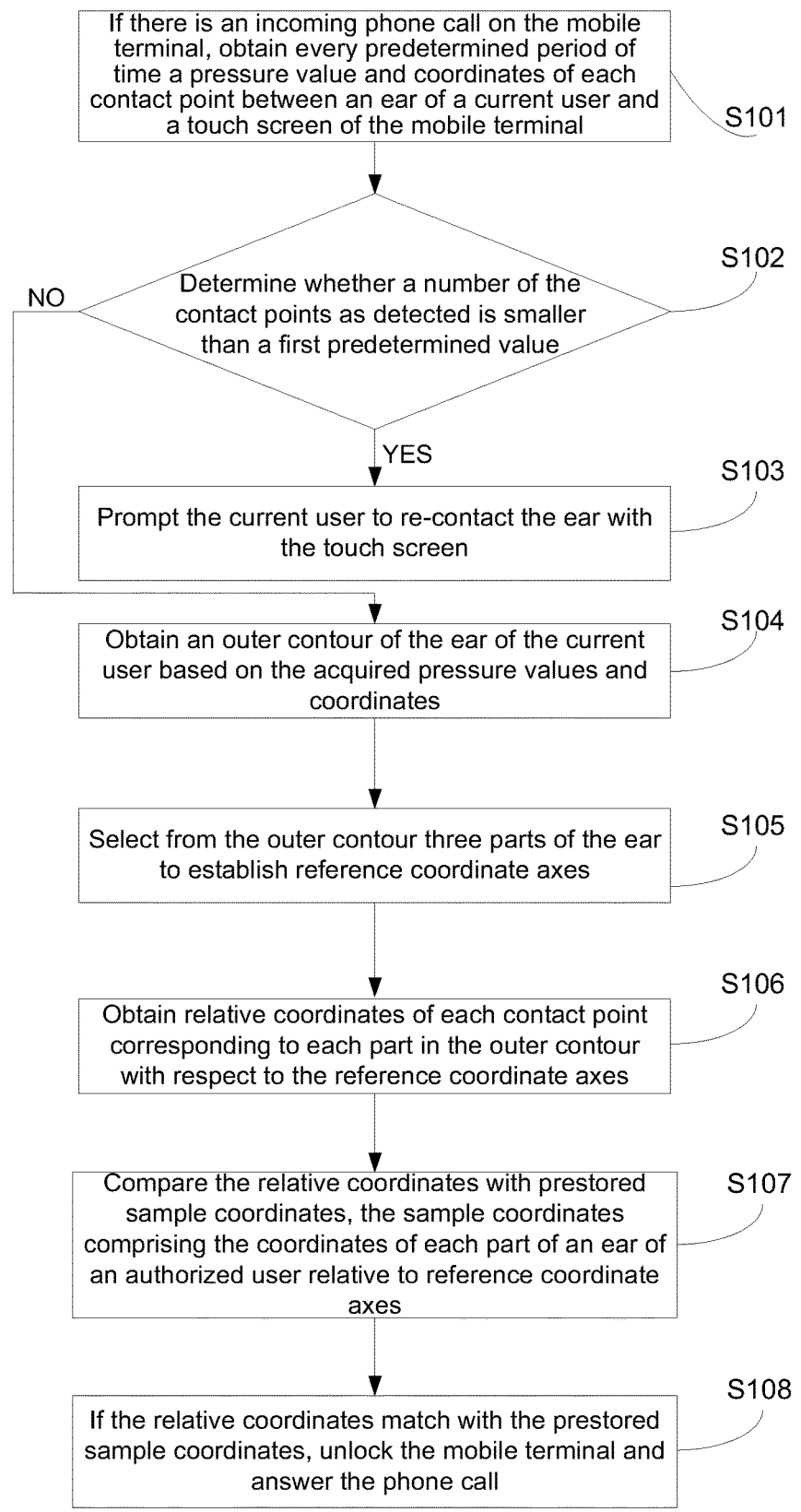
FIG. 1 is a flowchart illustrating a method of automatically answering a phone call according to an embodiment of the disclosure.

Referring to FIG. 1, a flowchart illustrating a method of automatically answering a phone call according to an embodiment of the disclosure is depicted. For purposes of illustration, the method is illustrated as being sequential. However, portions of the method may be performed in other orders or in parallel (e.g., simultaneously). The method may comprise the following blocks.

In S101, the method may comprise obtaining every predetermined period of time a pressure value and coordinates of each contact point between an ear of a current user and a touch screen of a mobile terminal, if there is an incoming phone call on the mobile terminal.

The touch screen may be a piezoelectric touch screen, which may employ the piezoelectric multi-touch technology combined with high-precision analog-to-digital converters (ADCs) to analyze the variation of strength of the voltage or current at each contact point when the human ear comes in contact with the touch screen, and the corresponding pressure value and coordinates of each contact point can be further obtained. Each pressure value may comprise a pressure magnitude and pressure area.

Different from the traditional resistive or capacitive touch technology, the piezoelectric multi-touch technology enables the touch control by way of voltage. In addition, the piezoelectric multi-touch technology also has functions including pressure sensing and detection.

In S102, the method may comprise determining whether a number of the contact points is smaller than a first predetermined value; and if so determined, turning to S103, otherwise entering step S104.

The purpose of determining whether the number of the contact points is smaller than the first predetermined value lies in determining whether the number of the contact points as detected can satisfy the subsequent matching requirements. The magnitude of the first predetermined value can be set depending on the application. For example, if a fast matching speed is required, then a relatively smaller first predetermined value may be configured; if a high matching accuracy is required, then a relatively greater first predetermined value will be configured.

In S103, the method may include prompting the user to re-contact the ear with the touch screen.

If in S102 the number of the contact points is determined as smaller than the first predetermined value, then the user may be prompted to contact his ear with the touch screen for a second time, so as to obtain more contact points.

In S104, the method may include obtaining an outer contour of the ear of the current user based on the pressure values and coordinates.

If in S102 the number of the contact points is determined as greater than or equal to the first predetermined value, then an outer contour of the ear of the current user may be analyzed based on the pressure values and the coordinates. The outer contour of the ear may comprise multiple parts, such as the triangular fossa, cymba conchae, cavum conchae, tragus, intertragic notch, scapha, helix, anthelix, crus of helix, antitragus, and lobule.

In S105, the method may include selecting among the outer contour three parts of the ear to establish reference coordinate axes.

It will be appreciated that, if a same ear assumes different contact positions relative to the touch screen, then the coordinates as acquired of the contact point corresponding to the same part of ear will also be different, hence the need for establishing a reference coordinate system based on the human ear. Typically, because of the ear the crus of helix, tragus, and antitragus are the most prominent, these three parts of the ear can be selected to establish the reference coordinate axes.

In S106, the method may include obtaining relative coordinates of each contact point corresponding to each part in the outer contour with respect to the reference coordinate axes.

Thus, with respect to the same ear, regardless of in what disposition the ear comes in contact with the touch screen, each contact point corresponding to each part of the ear will assume the same relative coordinates with respect to the reference coordinate axes. Further, it is understood that although different people may have different sized ears, the relative positions of various parts of an ear of a person are substantially constant. So to satisfy the subsequent matching requirements, the relative coordinates of each contact point corresponding to each part in the outer contour can be computed and used for subsequent matching.

In S107, the method may comprise comparing the relative coordinates against pre-stored sample coordinates, the pre-stored sample coordinates being the coordinates of each part of an ear of an authorized user relative to the reference coordinate axes.

In particular, comparing the relative coordinates with the pre-stored sample coordinates may specifically comprise: first computing an absolute difference between an abscissa in each relative coordinate pair and an abscissa in a sample coordinate pair, and an absolute difference between an ordinate in the relative coordinate pair and an ordinate in the sample coordinate pair, the relative coordinate pair and the sample coordinate pair corresponding to a same part of the ear, the absolute difference between the abscissas being recorded as a first absolute value, and the absolute difference between the ordinates being recorded as a second absolute value; obtaining a number of the relative coordinate pairs each of which the first absolute value lies within a first predetermined range and the second absolute value lies within a second predetermined range; and if the number is not smaller than a second predetermined value, determining that the relative coordinates match with the pre-stored sample coordinates. Typically, the first predetermined range may be the same with the second predetermined range.

In S108, if the relative coordinates match with the pre-stored sample coordinates, the mobile terminal may be unlocked and may then answer the phone call.

If in S107 the comparison result indicates that the relative coordinates match with the pre-stored sample coordinates, then the mobile terminal will be unlocked and may automatically answer the phone call.

Additionally, the method may further comprise the following block before S101: obtaining coordinates of each part of an ear of an authorized user relative to reference coordinate axes and storing the coordinates as sample coordinates.

For example, if there is an incoming phone call on the mobile terminal, the pressure value and coordinates (e.g., a pair of coordinates or coordinate pair) of each contact point between an ear of a current user and a touch screen of the mobile terminal are first obtained. Assuming the number of the contact points as detected satisfies the subsequent matching requirements and the contact points include A1, A2, A3, and A4, of which the corresponding coordinates are (x1, y1), (x2, y2), (x3, y3), (x4, y4), respectively. Then, an outer contour of the ear is obtained based on the pressure values and coordinates of the four contact points A1, A2, A3, and A4, and in the acquired outer contour of the ear, assuming A1 corresponds to the tragus, A2 to the antitragus, A3 to the crus of helix, and A4 to the antihelix. Next, the tragus, antitragus, and the crus of helix are selected from the outer contour to establish reference coordinate axes, and the relative coordinates (e.g., a pair of relative coordinates or coordinate pair) of each contact point corresponding to each part in the outer contour with respect to the reference coordinate axes are calculated, assuming the corresponding relative coordinates of the contact points, A1, A2, A3, and A4, are (a1, b1), (a2, b2), (a3, b3), and (a4, b4), respectively. Then the respective relative coordinates, (a1, b1), (a2, b2), (a3, b3), and (a4, b4), of the contact points, A1, A2, A3, and A4, are compared against pre-stored sample coordinates, which comprise the sample coordinates corresponding to the tragus, antitragus, crus of helix, and antihelix of an ear of an authorized user, the corresponding sample coordinates including (c1, d1), (c2, d2), (c3, d3), and (c4, d4) respectively. The specific process of comparison is as follows: first calculating an absolute difference $|a1-c1|$ between the abscissa a1 in the relative coordinate pair (a1, b1) and the abscissa c1 in the sample coordinates (c1, d1), and, likewise, calculating an absolute difference $|b1-d1|$ between the ordinate b1 in the same relative coordinate pair (a1, b1) and the ordinate d1 in the same sample coordinate pair (c1, d1), the relative coordinate pair (a1, b1) and the sample coordinate pair (c1, d1) both corresponding to the tragus; if $|a1-c1|$ lies in a first predetermined range and $|b1-d1|$ lies in a second predetermined range, then it indicates the relative coordinates and sample coordinates that correspond to the tragus match with each other, otherwise if $|a1-c1|$ doesn't lie in the first predetermined range or $|b1-d1|$ lies beyond the second predetermined range, it means the relative coordinates and sample coordinates corresponding to the tragus don't match. The comparison of the antitragus, crus of helix, and antitragus is similar to the above process, and thus will not be detailed again for simplicity. After completion of the comparison with respect to each of the trigger points A1, A2, A3, and A4, if the number of the matched trigger points reaches a second predetermined value, the mobile terminal would be unlocked and would then answer the phone call.

Those skilled in the art will also appreciate that a same part of the ear may correspond to multiple sample coordinate pairs. For example, the corresponding sample coordinate pairs of the antitragus of the ear may comprise four coordinate pairs, (c41, d41), (c42, d42), (c43, d43), (c44, d44). In this case, if the relative coordinates of the contact point corresponding to the antitragus are (a4, b4), and the relative coordinates (a4, b4) matches with any one of the sample coordinate pairs (c41, d41), (c42, d42), (c43, d43), (c44, d44), then the relative coordinates of the contact point will be deemed as matching with the sample coordinates.

Figure 2:
FIG. 2 is a block diagram illustrating a mobile terminal for automatically answering a phone call according to an embodiment of the disclosure.

Referring now to FIG. 2, a block diagram illustrating a mobile terminal for automatically answering a phone call according to an embodiment of the disclosure is depicted. The mobile terminal may comprise a touch screen 1, a data bus 2, a storage unit 3, and a Digital Signal Processing (DSP) unit 4.

If there is an incoming phone call on the mobile terminal, the touch screen 1 may obtain, every predetermined period of time, a pressure value and coordinates of each contact point between an ear of a current user and the touch screen 1, and transfer the pressure value and coordinates of each contact point to the storage unit 3 to be saved via the data bus 2. Each pressure value may comprise a pressure magnitude and pressure area. The data bus 2 may be an I2C bus.

The DSP unit 4 may receive the pressure value and coordinates of each contact point from the storage unit 3, and base on which to obtain an outer contour of the ear of the current user based on the pressure values and coordinates. Further, the DSP unit 4 may select three parts of the ear from the outer contour and establish reference coordinate axes according to the three parts, calculate the relative coordinates of each contact point corresponding to each part in the outer contour with respect to the reference coordinate axes, and compare the relative coordinates against pre-stored sample coordinates. If the DSP unit 4 determines the relative coordinates match with the pre-stored sample coordinates, it may unlock the mobile terminal and automatically answer the phone call. The pre-stored sample coordinates are the coordinates of each part of an ear of an authorized user relative to reference coordinate axes.

In particular, the specific process of the DSP unit 4 comparing the relative coordinates with the pre-stored sample coordinates may comprise the following. The DSP unit 4 may first compute an absolute difference between an abscissa in each relative coordinate pair and an abscissa in a sample coordinate pair, and an absolute difference between an ordinate in the same relative coordinate pair and an ordinate in the same sample coordinate pair, the relative coordinate pair and the sample coordinate pair both corresponding to a same part of the ear, wherein the absolute difference between the abscissas may be recorded as a first absolute value, and the absolute difference between the ordinates may be recorded as a second absolute value. The DSP unit 4 may then obtain a number of the relative coordinate pairs each of which the first absolute value lies within a first predetermined range and the second absolute value lies within a second predetermined range; and, if the number is not smaller than a second predetermined value, determine that the relative coordinates match with the pre-stored sample coordinates.

Typically, the DSP unit 4 may be configured to: determine whether a number of the contact points as detected is smaller than a first predetermined value; and if so determined, then prompt the current user to re-contact the ear with the touch screen, otherwise if the number of the contact points is equal to or greater than the first predetermined value, perform the operation of obtaining the outer contour of the ear of the current user based on the pressure values and the coordinates.

Optionally, the mobile terminal may further comprise an application processor 5 configured to: package the sample coordinates into firmware that is recognizable by the DSP unit 4; control the DSP unit 4 to switch from operating mode to download mode to download the firmware to the DSP unit 4; and continue to control the DSP unit 4 to switch from the download mode back to the operating mode.

Advantages of the present disclosure may follow. According to a method of automatically answering a phone call with a mobile terminal that is provided by the disclosure, if there is an incoming phone call on the mobile terminal, a pressure value and coordinates of each contact point between an ear of a current user and a touch screen of the mobile terminal would be obtained every predetermined period of time. Then an outer contour of the ear can be analyzed according to the pressure values and the coordinates. Among the outer contour three parts of the ear may then be selected to establish reference coordinate axes and relative coordinates of each contact point corresponding to each part in the outer contour may thus be computed with respect to the reference coordinate axes. The relative coordinates may then be compared against pre-stored sample coordinates, and, if they match with each other, the mobile terminal may be unlocked and may automatically answer the phone call. Thus, with the present disclosure the user can automatically answer a phone call by simply touching this ear to the touch screen of the mobile terminal, providing ease of use with mobile terminals.

The above description merely depicts some exemplary embodiments of the disclosure, but is not meant to limit the scope of the disclosure. Any equivalent structure or flow transformations made to the disclosure, or any direct or indirect applications of the disclosure on any other related fields, shall all be covered within the protection of the disclosure.

What is claimed is:

1. A method of automatically answering a phone call with a mobile terminal, the method comprising:
obtaining a coordinate pair of each part of an ear of an authorized user relative to reference coordinate axes and storing the coordinate pair as a sample coordinate pair;
obtaining, at every predetermined period of time, a pressure value and a coordinate pair of each contact point between an ear of a current user and a touch screen of the mobile terminal when there is an incoming phone call, each pressure value comprising a pressure magnitude and pressure area;
determining whether a number of the contact points as detected is smaller than a first predetermined value;
if so determined, prompting the current user to re-contact the ear with the touch screen; and if not so determined, obtaining an outer contour of the ear of the current user based on the pressure values and the coordinate pairs;
selecting among the outer contour three parts of the ear to establish reference coordinate axes;
calculating a relative coordinate pair of each contact point corresponding to each part of the ear in the outer contour with respect to the reference coordinate axes;
comparing the relative coordinate pairs against the sample coordinate pairs of each part of the ear of the authorized user relative to the reference coordinate axes; and
unlocking and automatically answering the phone call when the relative coordinate pairs match the sample coordinate pairs.

2. The method according to claim 1, wherein the comparing the relative coordinates with the sample coordinate pair comprises:
computing and recording, between each relative coordinate pair and a corresponding sample coordinate pair, an absolute difference between abscissas as a first absolute value, and an absolute difference between ordinates as a second absolute value, the relative coordinate pair and the corresponding sample coordinate pair both corresponding to a same part of the ear;
obtaining a number of the relative coordinate pairs each of which the first absolute value lies within a first predetermined range and the second absolute value lies within a second predetermined range; and
determining the relative coordinates match the stored sample coordinates when the number of the relative coordinate pairs is greater than or equal to a second predetermined value.

3. The method according to claim 1, wherein the selecting among the outer contour the three parts of the ear to establish the reference coordinate axes comprises:
selecting from the outer contour a crus of helix, tragus, and antitragus of the ear to establish the reference coordinate axes.

4. A method of automatically answering a phone call with a mobile terminal, the method comprising:
obtaining, at every predetermined period of time, a pressure value and coordinates of each contact point between an ear of a current user and a touch screen of the mobile terminal when there is an incoming phone call, each pressure value comprising a pressure magnitude and pressure area;
obtaining an outer contour of the ear of the current user based on the pressure values and the coordinates;
selecting, among the outer contour three parts of the ear to establish reference coordinate axes;
calculating a relative coordinate pair of each contact point corresponding to each part of the ear in the outer contour with respect to the reference coordinate axes;
comparing the relative coordinates against pre-stored sample coordinate pairs, of each part of an ear of an authorized user relative to the reference coordinate axes; and
unlocking and automatically answering the phone call when the relative coordinate pairs match the pre-stored sample coordinate pairs.

5. The method according to claim 4, further comprising, after the obtaining, at every predetermined period of time, the pressure value and coordinates of each contact point:
determining whether a number of the contact points as detected is smaller than a first predetermined value;
if so determined, prompting the current user to recontact the ear with the touch screen; and
if not so determined, obtaining an outer contour of the ear of the current user based on the pressure values and coordinates.

6. The method according to claim 5, wherein the comparing the relative coordinates with the pre-stored sample coordinate pairs comprises:
computing an absolute difference of abscissas and an absolute difference of ordinates between each relative coordinate pair and a pre-stored sample coordinate pair, the relative coordinate pair and the pre-stored sample coordinate pair both corresponding to a same part of the ear, the absolute difference between the abscissas being recorded as a first absolute value and the absolute difference between the ordinates being recorded as a second absolute value;
obtaining a number of the relative coordinate pairs each of which the first absolute value lies within a first predetermined range and the second absolute value lies within a second predetermined range; and
determining whether the relative coordinates match the pre-stored sample coordinates when the number is greater than or equal to a second predetermined value.

7. The method according to claim 4, wherein the selecting among the outer contour the three parts of the ear to establish the reference coordinate axes comprises:
selecting from the outer contour a crus of helix, tragus, and antitragus of the ear to establish the reference coordinate axes.

8. The method according to claim 4, further comprising, before obtaining at every predetermined period of time the pressure value and coordinates of each contact point:
obtaining coordinate pairs of each part of an ear of an authorized user relative to reference coordinate axes and storing the coordinates as sample coordinate pairs.

9. A mobile terminal for automatically answering a phone call, the mobile terminal comprising a touch screen and a Digital Processing Unit (DSP), wherein
the touch screen is configured to obtain, at every predetermined period of time, a pressure value and coordinate pairs of each contact point between an ear of a current user and the touch screen when there is an incoming phone call, each pressure value comprising a pressure magnitude and pressure area; and
the DSP unit is configured to: obtain an outer contour of the ear of the current user based on the pressure values and coordinate pairs; select, among the outer contour of the ear, parts of the ear to establish reference coordinate axes; compute relative coordinate pairs, of the contact points, each corresponding to one of the parts of the ear in the outer contour of the ear with respect to the reference coordinate axes; compare the relative coordinate pairs against pre-stored sample coordinate pairs of each part of an ear of an authorized user relative to reference coordinate axes; and unlock the mobile terminal and automatically answer the phone call when determining the relative coordinate pairs match the pre-stored sample coordinate pairs.

10. The mobile terminal according to claim 9, wherein the DSP unit is further configured to: determine whether a number of the contact points as detected is smaller than a first predetermined value; and if so determined, prompt the current user to recontact the ear with the touch screen, and if not so determined, perform the operation of obtaining the outer contour of the ear of the current user based on the pressure values and the coordinates.

11. The mobile terminal according to claim 10, wherein the DSP unit is further configured to: compute and record an absolute difference between an abscissa and an ordinate of each relative coordinate pair and an abscissa and an ordinate of a sample coordinate pair, the relative coordinate pair and the sample coordinate pair both corresponding to a same part of the ear, the absolute difference between the abscissas being recorded as a first absolute value and the absolute difference between the ordinates being recorded as a second absolute value;

obtain a number of the relative coordinate pairs each of which the first absolute value lies within a first predetermined range and the second absolute value lies within a second predetermined range; and determine whether the number of relative coordinate pairs match the pre-stored sample coordinate pairs is greater than or equal to a second predetermined value.

12. The mobile terminal according to claim 9, wherein the DSP unit is further configured to select from the outer contour a crus of helix, tragus, and antitragus of the ear to establish the reference coordinate axes.

13. The mobile terminal according to claim 9, further comprising an application processor configured to: package the sample coordinates into firmware that is recognizable by the DSP unit; control the DSP unit to switch from operating mode to download mode to download the firmware to the DSP unit; and continue to control the DSP unit to switch from the download mode back to the operating mode.

14. The method according to claim 1, wherein a magnitude of the first predetermined value is set depending on application, comprising:

if a fast matching speed is required, a relatively small first predetermined value is configured; and if a high matching accuracy is required, a relatively great first predetermined value is configured.

15. The method according to claim 2, wherein each part of the ear of the authorized user corresponds to a plurality of sample coordinate pairs, and computing the absolute differences between the abscissas and between the ordinates comprises:

computing an absolute difference between an abscissa and an ordinate of each relative coordinate pair and an abscissa and an ordinate of any one of the plurality of sample coordinate pairs, the relative coordinate pair and the plurality of sample coordinate pairs both corresponding to a same part of the ear, the absolute difference between abscissas being recorded as a first absolute value and the absolute difference between ordinates as a second absolute value.

16. The method according to claim 5, wherein a magnitude of the first predetermined value is set depending on application, comprising:

if a fast matching speed is required, a relatively small first predetermined value is configured; and if a high matching accuracy is required, a relatively great first predetermined value is configured.

17. The mobile terminal according to claim 9, wherein the touch screen is a piezoelectric touch screen.

18. The mobile terminal according to the claim 17, wherein the piezoelectric touch screen employs piezoelectric multi-touch technology and high-precision analog-to-digital converters (ADCs) to analyze variation of strength of voltage or current at the each contact point to obtain the corresponding pressure value and coordinate pairs.

19. The mobile terminal according to claim 11, wherein each part of the ear of the authorized user corresponds to a plurality of sample coordinate pairs, and the DSP unit computing the absolute differences between the abscissas and between the ordinates comprises:

computing, by the DSP unit, an absolute difference between an abscissa and an ordinate of each relative coordinate pair and an abscissa and an ordinate of any one of the plurality of sample coordinate pairs, the relative coordinate pair and the plurality of sample coordinate pairs both corresponding to a same part of the ear, the absolute difference of the abscissas being recorded as a first absolute value and the absolute difference of the ordinates being recorded as a second absolute value.

20. The mobile terminal according to claim 10, wherein a magnitude of the first predetermined value is set depending on application, comprising:

if a fast matching speed is required, a relatively small first predetermined value is configured; and if a high matching accuracy is required, a relatively great first predetermined value is configured.

* * * * *